(12) United States Patent
Ishibashi

(10) Patent No.: US 8,154,370 B2
(45) Date of Patent: Apr. 10, 2012

(54) LINEAR SOLENOID

(75) Inventor: Ryo Ishibashi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/947,145

(22) Filed: Nov. 16, 2010

(65) Prior Publication Data

US 2011/0115587 A1 May 19, 2011

(30) Foreign Application Priority Data

Nov. 16, 2009 (JP) ................................. 2009-260992

(51) Int. Cl.
*H01F 7/08* (2006.01)
*F16K 31/02* (2006.01)

(52) U.S. Cl. .................................. 335/220; 251/129.15
(58) Field of Classification Search .................. 335/220; 251/129.15
See application file for complete search history.

(56) References Cited

U.S. PATENT DOCUMENTS

| 6,206,343 | B1 * | 3/2001 | Kato et al. | 251/129.15 |
| 6,498,416 | B1 * | 12/2002 | Oishi et al. | 310/214 |
| 6,604,726 | B2 * | 8/2003 | Kumar | 251/129.16 |
| 6,953,186 | B2 * | 10/2005 | Kaneda et al. | 251/129.2 |
| 7,468,647 | B2 * | 12/2008 | Ishibashi et al. | 335/281 |
| 7,973,627 | B2 * | 7/2011 | Yamagata et al. | 335/255 |
| 2001/0009164 | A1 * | 7/2001 | Motoki et al. | 137/625.65 |
| 2002/0101314 | A1 | 8/2002 | Oishi et al. | |
| 2002/0134444 | A1 * | 9/2002 | Isobe | 137/625.65 |
| 2003/0189183 | A1 | 10/2003 | Noller et al. | |
| 2004/0112445 | A1 * | 6/2004 | Fischer | 137/625.64 |
| 2006/0017535 | A1 * | 1/2006 | Nagasaki | 335/220 |
| 2006/0243938 | A1 | 11/2006 | Ishibashi et al. | |

FOREIGN PATENT DOCUMENTS

| JP | U-02-043578 | 3/1990 |
| JP | 02-151006 | 6/1990 |
| JP | 11-182725 | 7/1999 |

OTHER PUBLICATIONS

Japanese Office Action dated Nov. 29, 2011, issued in corresponding Japanese Application No. 2009-260992 with English Translation.

* cited by examiner

*Primary Examiner* — Elvin G Enad
*Assistant Examiner* — Alexander Talpalatskiy
(74) *Attorney, Agent, or Firm* — Nixon & Vanderhye PC

(57) ABSTRACT

A linear solenoid includes a plunger to slide in an axis direction, and a stator core. The plunger includes a magnetic base, and a nonmagnetic plating layer defined on the magnetic base. The stator core has a first blocker arranged between a first magnetic core and a second magnetic core. The second magnetic core has a second blocker distanced from the first blocker in the axis direction. Each of the blockers limits a magnetic reaction. The plunger directly slides on an inner circumference face of the stator core at only two sections corresponding to the first and second blockers.

5 Claims, 7 Drawing Sheets

LINEAR SOLENOID

CROSS REFERENCE TO RELATED APPLICATION

This application is based on Japanese Patent Application No. 2009-260992 filed on Nov. 16, 2009, the disclosure of which is incorporated herein by reference in its entirety.

BACKGROUND OF THE INVENTION

1. Field of the Invention

The present invention relates to a linear solenoid.

2. Description of Related Art

JP-A-2002-222710 discloses a linear solenoid having a plunger 3 and a stator core 5, as shown in FIG. 7A. The plunger 3 directly slides on an inner circumference face of the stator core 5. The linear solenoid has a sliding gap or clearance between the plunger 3 and the stator core 5. Due to the gap, the plunger 3 is supported by the inner circumference face of the stator core 5 in a manner that the plunger 3 flexibly slides in an axis direction. The gap is defined to absorb manufacture variations of an outer diameter dimension of the plunger 3 and an inner diameter dimension of the stator core 5.

As shown in FIG. 7A, due to the sliding gap, the plunger 3 becomes eccentric in a radial direction from a center axis of the stator core 5 by gravity or vibration. If electricity is supplied to a coil in this eccentric state, a bias will be generated in magnetic flux when the magnetic flux is transmitted between the plunger 3 and the stator core 5 in the radial direction. At this time, a lateral force F is generated to the plunger 3 in the radial direction by the bias of magnetic flux. The lateral force F is applied in a direction in which the bias of magnetic flux is generated. In this case, the plunger 3 may be inhibited from having smooth sliding movement.

Therefore, the bias of magnetic flux is required to be reduced. As shown in FIG. 7B, the plunger 3 of the linear solenoid is made of a magnetic base 11 and a nonmagnetic plating layer 12. The magnetic base 11 is made of magnetic material such as iron. The plating layer 12 is made of nonmagnetic material such as NiP, and is formed on a surface of the magnetic base 11. The bias of magnetic flux is eased in the radial direction by making a thickness of the plating layer 12 larger. Thus, the lateral force F can be reduced.

However, in this case, a large error may be generated in the thickness of the plating layer 12. Because it is necessary to accurately cut or shave an outer side of the plunger 3 after a plating treatment, manufacturing cost becomes high.

This disadvantage will be specifically described with reference to FIG. 8 based on the following definitions.

The magnetic base 11 has an outer diameter dimension of $\Phi D_0$ corresponding to a plunger main diameter.

The plunger 3 constructed by the magnetic base 11 and the plating layer 12 has an outer diameter dimension of $\Phi D_1$.

The plating layer 12 is required to have a thickness α so as to prevent the bias of magnetic flux.

A sliding hole 4 of the stator core 5 has an inner diameter dimension A so as to make the plunger 3 to slide.

The stator core 5 and the plunger 3 have a sliding clearance B.

High accuracy is required for the outer diameter dimension $\Phi D_1$ of the plunger 3 so as to lower hysteresis.

For example, the stator core 5 and the plunger 3 have the sliding clearance of 20 μm(=B), and the plating layer 12 has a large thickness of 80 μm(=α). A nonmagnetic distance in the radial direction is required to have a range of 40 μm-80 μm so as to prevent the bias of magnetic flux. In this example, the plunger 3 will be produced in the following processes.

(1) An outer side of the magnetic base 11 in the radial direction is cut or shaved, such that the magnetic base 11 has the outer diameter dimension $\Phi D_0$.

($\Phi D_0 = A - 20\ \mu m \times 80\ \mu m \times 2$)

(2) The nonmagnetic plating layer 12 is applied to a surface of the magnetic base 11 so as to have a large thickness. In this plating process, a thickness error may be generated by 20% at the maximum. Therefore, the plating layer 12 having a thickness equal to or larger than 100 μm is formed so as to definitely obtain the plating layer of 80 μm.

(3) An outer side of the plating layer 12 in the radial direction is cut or shaved, such that the plunger 3 has the outer diameter dimension $\Phi D_1$.

($\Phi D_1 = A - 20\ \mu m \times 2$)

Thus, the nonmagnetic plating layer 12 can have the thickness of 80 μm(=α), such that the plunger 3 having the required accuracy can be produced.

In this example, the high-accuracy cutting/shaving process is necessary twice for producing the plunger 3, such that producing cost of the plunger 3 becomes higher. Further, a time necessary for the plating process becomes long, because the plating layer 12 needs the large thickness, such that productivity of the plunger 3 becomes lower.

SUMMARY OF THE INVENTION

In view of the foregoing and other problems, it is an object of the present invention to provide a linear solenoid.

According to an example of the present invention, a linear solenoid includes a coil to generate a magnetic force by being supplied with electricity; a plunger supported slidably in an axis direction; and a stator core. The stator core integrally has a first magnetic core to attract the plunger using the magnetic force generated by the coil; a second magnetic core to transmit magnetism with the plunger in a radial direction; and a first blocker arranged between the first magnetic core and the second magnetic core so as to restrict the first magnetic core and the second magnetic core from directly and magnetically combining with each other. The plunger directly slides on an inner circumference face of the stator core. The second magnetic core has a second blocker distanced from the first blocker in the axis direction. The second blocker restricts the second magnetic core from forming a magnetic path. Each of the first blocker and the second blocker is defined by forming an annular slot on an outer circumference face of the stator core. The plunger has a magnetic base and a nonmagnetic plating layer defined on a surface of the magnetic base. The nonmagnetic plating layer directly slides on the inner circumference face of the stator core. The magnetic base has a first projection projected in the radial direction and located in a range of the first blocker relative to entire stroke range of the plunger in the axis direction; a second projection projected in the radial direction and located in a range of the second blocker relative to entire stroke range of the plunger in the axis direction; and a plunger main tube located between the first projection and the second projection in the axis direction so as to transmit magnetism with the second magnetic core in the radial direction. The plating layer is arranged on at least outer faces of the first and second projections. The plating layer of the first projection slides on an inner circumference face of the first blocker at a first sliding section. The plating layer of the second projection slides on an inner circumference face of the second blocker at a second sliding section.

The plunger directly slides on the inner circumference face of the stator core only at the first sliding section and the second sliding section.

Accordingly, productivity of the linear solenoid can be raised, and manufacturing cost of the linear solenoid can be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

Figure 1A:
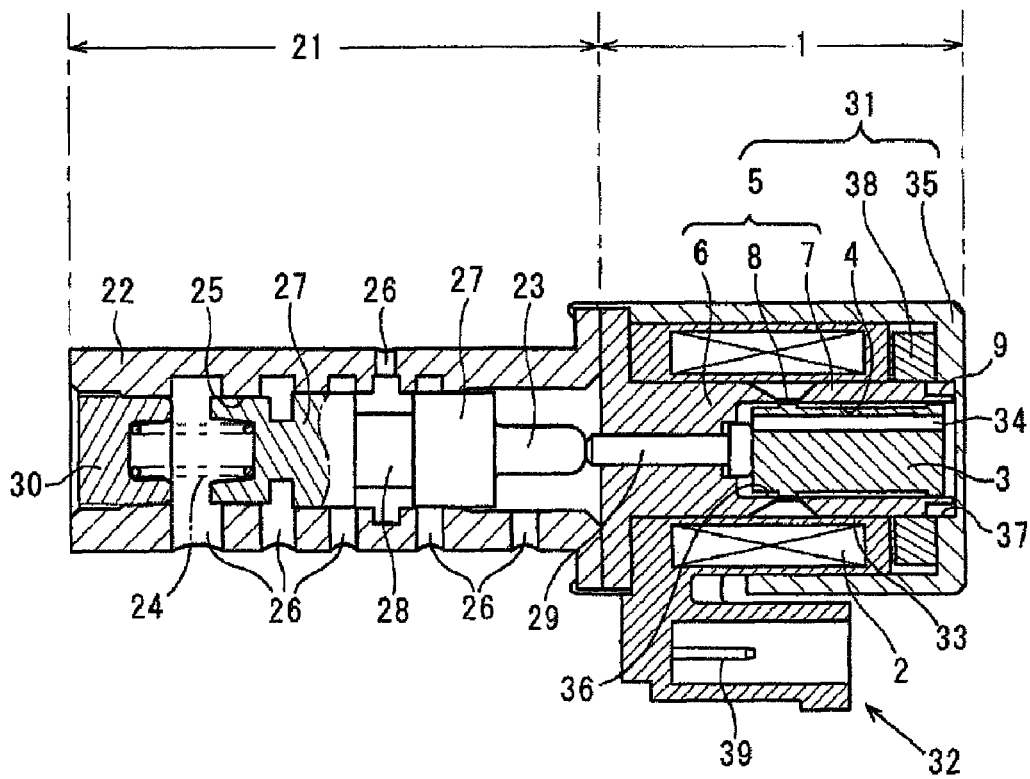
FIG. 1A is a schematic cross-sectional view illustrating an electromagnetic spool valve including a linear solenoid according to a first embodiment.

As shown in FIG. 1A, a linear solenoid 1 includes a coil 2, a plunger 3 and a stator core 5 having a sliding hole 4. The coil 2 generates a magnetic force by being supplied with electricity. The plunger 3 is supported in a state that the plunger 3 can flexibly slide in an axis direction. The sliding hole 4 extends in the axis direction with a constant inner diameter. The plunger 3 directly slides on an inner circumference face of the sliding hole 4 of the stator core 5.

The stator core 5 has a first magnetic core 6, a second magnetic core 7 and a first magnetism blocker 8. The first core 6 attracts the plunger 3 using the magnetic force generated by the coil 2. The second core 7 transmits magnetism with the plunger 3 in the radial direction. The first magnetism blocker 8 is located between the first core 6 and the second core 7 in the axis direction. The blocker 8 has an annular shape, and prevents the cores 6, 7 from directly and magnetically combining with each other. The first core 6, the first blocker 8, and the second core 7 are integrated with each other in the stator core 5.

The second magnetic core 7 has a second magnetism blocker 9 at a position separated from the first magnetism blacker 8 in the axis direction. The second magnetism blocker 9 prevents a formation of magnetic path in the second core 7. The blocker 8, 9 is defined by forming an annular slot on an outer circumference face of the stator core 5. An inner circumference face of the sliding hole 4 is not affected by the blocker 8, 9.

Figure 2:
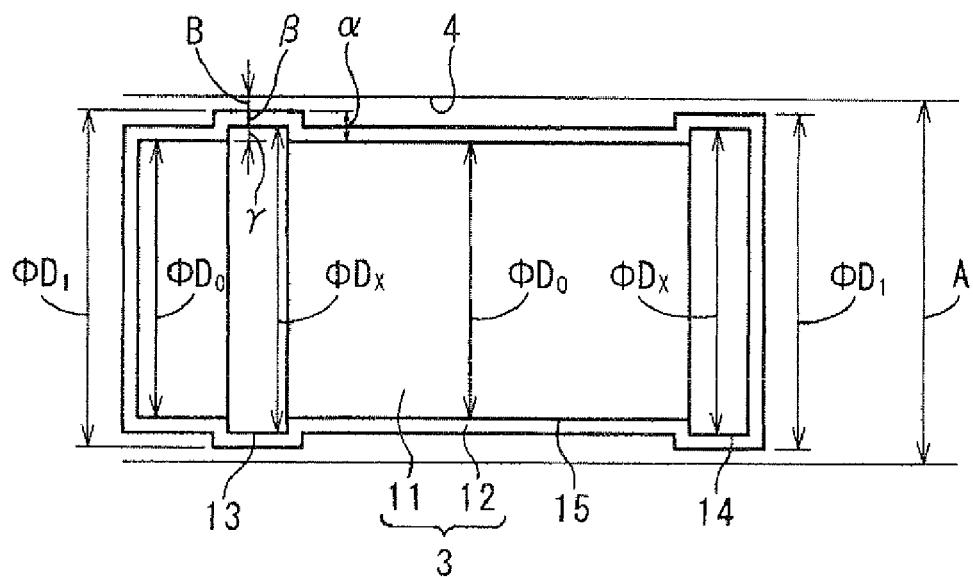
FIG. 2 is a schematic view illustrating a plunger of the linear solenoid.

As shown in FIG. 2, the plunger 3 is made of a magnetic base 11 and a nonmagnetic plating layer 12. The magnetic base 11 is made of magnetic material such as iron. The plating layer 12 is made of nonmagnetic material such as nickel or zinc. The plating layer 12 is formed on a surface of the magnetic base 11, and directly slides on the inner circumference face of the stator core 5.

Figure 1B:
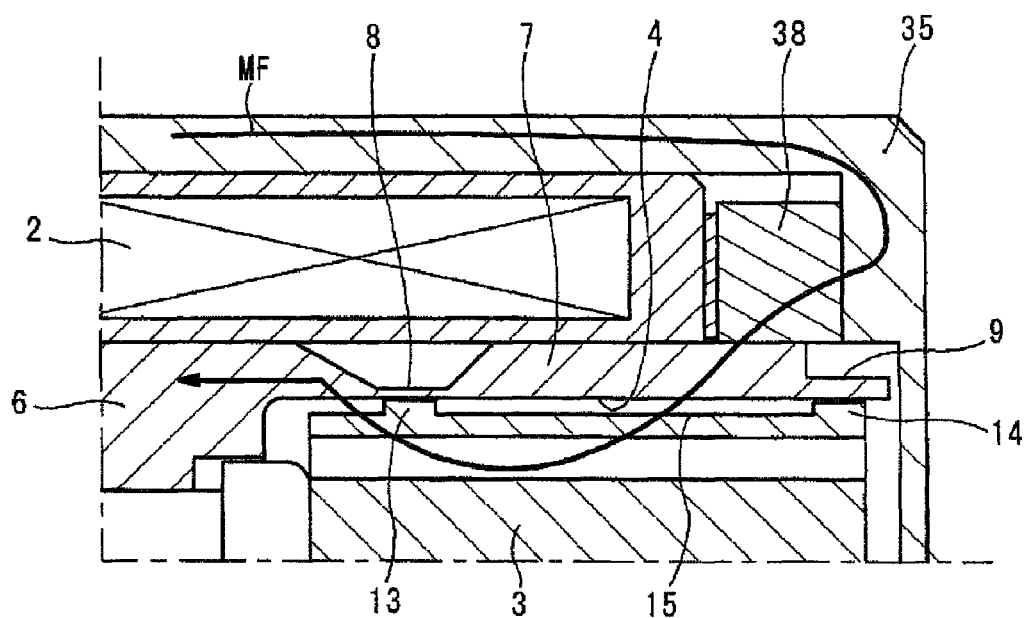
FIG. 1B is an enlarged cross-sectional view illustrating the linear solenoid.

The magnetic base 11 has a first projection 13, a second projection 14 and a plunger main tube 15. As shown in FIG. 1B, the first projection 13 projects in the radial direction, and is located in a range of the first blocker 8 in the axis direction relative to entire stroke range of the plunger 3. The second projection 14 projects in the radial direction, and is located in a range of the second blocker 9 in the axis direction relative to entire stroke range of the plunger 3. The plunger main tube 15 is arranged at least between the first projection 13 and the second projection 14 in the axis direction, and transmits magnetism with the second core 7 in the radial direction. The plating layer 12 is formed on at least an outer surface of the projection 13, 14.

The plunger 3 directly slides on the stator core 5 at only two positions, that are a first sliding section and a second sliding section. The plating layer 12 of the first projection 13 slides and contacts an inner circumference face of the first blocker 8 at the first sliding section. The plating layer 12 of the second projection 14 slides and contacts an inner circumference face of the second blocker 9 at the second sliding section. The plunger 3 does not directly slide on the stator core 5 at a position different from the first and second projections 13, 14.

The linear solenoid 1 is applied to an electromagnetic hydraulic control valve to control an automatic shift, for example. In this embodiment, a left side of FIG. 2 is explained as a front side, and a right side of FIG. 2 is explained as a rear side. However, directions of the front side and the rear side are not limited in an actual mounting direction of the linear solenoid 1.

A structure of the electromagnetic hydraulic control valve is explained with reference to FIG. 1A. The control valve is mounted in a hydraulic control device of the automatic shift, for example. Specifically, the control valve is attached to a hydraulic controller case arranged at a lower part of the automatic shift, and includes a spool valve 21 and the linear solenoid 1 to drive the spool valve 21.

The spool valve 21 has a sleeve 22, a spool 23, and a return spring 24, for example. The sleeve 22 has an approximately cylindrical shape. An insert hole 25 is defined in a center of the sleeve 22, and slidably supports the spool 23. An oil port 26 is defined to extend in the radial direction of the sleeve 22. The oil port 26 may be an input port, output port, discharge port or drain port. The input port communicates with an oil discharge port of an oil pump (not shown), and an input pressure is supplied to the input port. An output pressure adjusted by the control valve is output through the output port. The discharge port communicates with a low-pressure side. The drain port is used for ventilation.

The spool 23 is slidably arranged in the sleeve 22, and changes an open area of the oil port 26. The spool 23 switches communication state of the oil port 26, and includes plural lands 27 and a small diameter part 28. The land 27 closes the oil port 26, and the small diameter part 28 is arranged between the lands 27. A shaft 29 extending to inside of the linear solenoid 1 is contact with a rear end of the spool 23. A rear end of the shaft 29 is contact with a front end face of the plunger 3. The plunger 3 is arranged to drive the spool 23 in the axis direction.

The spring 24 is a compression coil spring to bias the spool 23 rearward, and is arranged in a spring chamber located in a front part of the sleeve 22 in a compression state. One end of the spring 24 is contact with a front face of the spool 23, and the other end is contact with a bottom face of an adjustment screw 30 to close a front end of the insert hole 25 of the sleeve 22. A biasing force of the spring 24 can be adjusted by a screwing amount of the adjustment screw 30.

The linear solenoid 1 has the coil 2, the plunger 3, a magnetic stator 31, and a connector 32. When electricity is supplied to the coil 2, a magnetic force is generated, and a loop of magnetic flux MF is formed, as shown in FIG. 1B. The magnetic flux MF passes through the plunger 3 and the magnetic stator 31. The coil 2 is formed by winding conducting wire, such as enameled wire having insulation cover, around a resin bobbin 33.

The plunger 3 is made of magnetic metal, for example, ferromagnetic material such as iron, and has an approximately pillar shape. The plunger 3 directly slides on the inner circumference face of the magnetic stator 31. Specifically, the plunger 3 slides on the inner circumference face of the sliding hole 4 of the stator core 5. Because the front end face of the plunger 3 is contact with a tip end of the shaft 29 of the spool 23, the plunger 3 is also biased rearward by the biasing force of the spring 24 together with the spool 23. A ventilation pore 34 extends inside of the plunger 3 in the axis direction.

The magnetic stator 31 has a yoke 35 and the stator core 5. The yoke 35 is made of magnetic material, and has an approximately cup shape to cover an outer periphery of the coil 2. The stator core 5 is made of magnetic material, and integrally has the first magnetic core 6, the first magnetism blocker 8, and the second magnetic core 7. The stator core 5 is inserted from a front side of the yoke 35, and is fixed between the yoke 35 and the sleeve 22.

The yoke 35 is made of magnetic metal, for example, ferromagnetic material such as iron, and covers the coil 2. The magnetic flux MF passes through the yoke 35. After components of the linear solenoid 1 are disposed in the yoke 35, a nail part (not shown) defined on an end of the yoke 35 is firmly combined with the sleeve 22.

The first magnetic core 6 opposes to the plunger 3 in the axis direction. The first core 6 is made of magnetic metal, for example, ferromagnetic material such as iron, and magnetically attracts the plunger 3. A magnetic attraction part corresponding to a main magnetism gap is defined between the first core 6 and the plunger 3.

The first core 6 has a sliding hole inside, and the sliding hole supports the shaft 29 to be slidable in the axis direction. Moreover, the first core 6 integrally has a flange magnetically combined with an open end of the yoke 35. The flange may be arranged separatedly from the first core 6. A ventilation pore or slot (not shown) extends inside of the first core 6 in the axis direction.

A tube-shape concave 36 is defined in a rear part of the first core 6, and an end portion of the plunger 3 is inserted into the concave 36. The first core 6 and a front part of the plunger 3 are arranged to overlap with each other in the axis direction. Because a taper is formed on a rear side outer face of the concave 36, magnetic attraction force is not changed even if a stroke amount of the plunger 3 is changed.

The first blocker 8 is a magnetic saturation part to restrict the magnetic flux MF from directly flowing between the first core 6 and the second core 7. The first blocker 8 has a membrane shape, thereby magnetic reluctance is made larger.

Specifically, the first blocker 8 is a thin-wall part defined by forming an annular slot on the outer circumference face of the stator core 5. The first blocker 8 is defined between a bottom face of the annular slot and the inner circumference face of the stator core 5. Moreover, many micropores are defined all the circumferences of the first blocker 8 by laser beam machining. Therefore, magnetism screening effect can be enhanced between the first core 6 and the second core 7.

The second core 7 is made of magnetic metal, for example, ferromagnetic material such as iron, and has a cylindrical shape to cover approximately whole of the plunger 3. The magnetic flux MF is transmitted between the plunger 3 and the second core 7 in the radial direction. A magnetic delivery part corresponding to a side magnetism gap is formed between the second core 7 and the plunger 3. The second core 7 is located in a concave 37 defined in a rear side center bottom of the yoke 35. The second core 7 is magnetically combined with the yoke 35 through a ring core 38.

The ring core 38 raises the magnetic coupling between the yoke 35 and the second core 7. The stator core 5 of the linear solenoid 1 is inserted into the yoke 35 through a left-side opening, and is fixed to the yoke 35 at the opening side. In contrast, as shown in FIG. 1B, a right tip end of the second core 7 is not fixed to the yoke 35.

When the second core 7 is arranged inside of the yoke 35 in this un-fixed state, the tip end of the second core 7 may hit a wall of the concave 37, due to manufacturing variation or axial gap error of the stator core 5. At this time, the second core 7 may have a deformation, and sliding characteristics of the plunger 3 may be affected.

Therefore, sufficient assembling clearance to absorb the manufacturing variation or axial gap error of the stator core 5 is necessary between the tip end of the second core 7 and the yoke 35 in the radial direction. However, as the assembling clearance becomes larger, magnetism transmission efficiency will be decreased, and magnetism attraction performance of the plunger 3 will be decreased. That is, the magnetism attraction performance of the plunger 3 may be affected by the assembling clearance.

This disadvantage is resolved by the ring core 38 fixed to the outer periphery of the second core 7. The ring core 38 magnetically combines with both of the second core 7 and the bottom of the yoke 35. The ring core 38 is made of magnetic material, for example, ferromagnetic material such as iron, and has a ring disk shape with a predetermined thickness. The ring core 38 is arranged between the bobbin 33 and the bottom of the yoke 35 in the axis direction. An inner circumference face of the ring core 38 has a cylinder shape approximately parallel to the outer circumference face of the second core 7 through minute assembling clearance. The ring core 38 is mounted to the outer periphery of the second core 7, and is flexibly slidable in the axis direction.

The ring core 38 has a thickness slightly smaller than a clearance between the bobbin 33 and the bottom of the yoke 35 in the axis direction. An elastic member such as wave washer, pan spring or rubber is arranged between the bobbin 33 and the ring core 38, and presses the ring core 38 toward the bottom of the yoke 35. That is, the ring core 38 is always contact with the bottom of the yoke 35.

The elastic member may be eliminated. At this time, the ring core 38 is magnetically attracted and contacts the bottom of the yoke 35, when magnetic flux MF is generated by energizing the coil 2.

A clearance is defined between the outer circumference face of the ring core 38 and the inner circumference face of the yoke 35 in the radial direction. The ring core 38 is also displaceable in the radial direction in accordance with a displacement of the tip end of the second core 7 in the radial direction. The clearance in the radial direction is set larger than a sum of "an eccentricity amount of the tip end of the second core 7 in the radial direction, which is generated by an amount of the manufacturing variation of the stator core 5" and "an eccentricity amount of the tip end of the second core 7 in the radial direction, which is generated by an amount of the axial gap error at a time of assembling".

The connector 32 is electrically connected with an electronic control unit (not shown AT-ECU) to control the control valve through a connection line. A terminal 39 is arranged in the connector 32, and is connected to an end of the coil 2.

A comparison example will be briefly described relative to the embodiment.

Figure 7A:
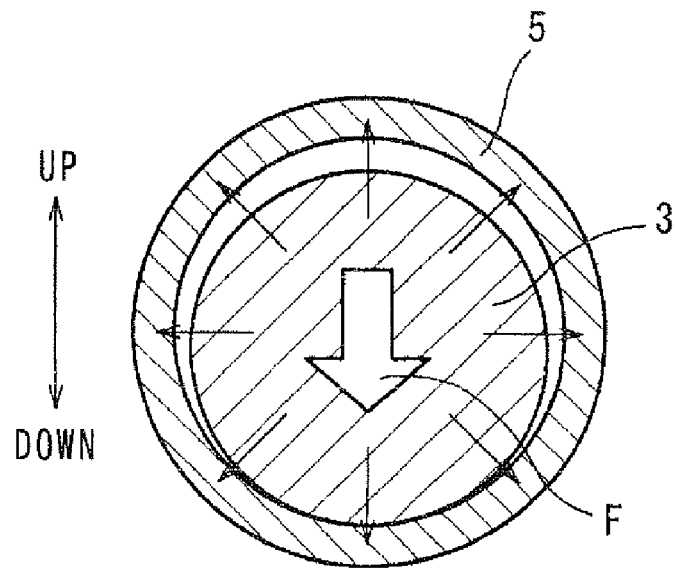
FIG. 7A is a schematic cross-sectional view illustrating a stator core and a plunger of a comparison example.

The plunger 3 and the second core 7 have a sliding gap in the radial direction when the plunger 3 directly slides on the inner circumference face of the sliding hole 4 of the stator core 5. As shown in FIG. 7A, if the plunger 3 is made of only magnetic metal, the plunger 3 becomes eccentric to the center axis of the sleeve 22 in the radial direction. At this time, bias of magnetic flux is generated, and a lateral force F is applied to the plunger 3 in the radial direction. Therefore, the plunger 3 is inhibited from having smooth sliding movement.

Figure 7B:
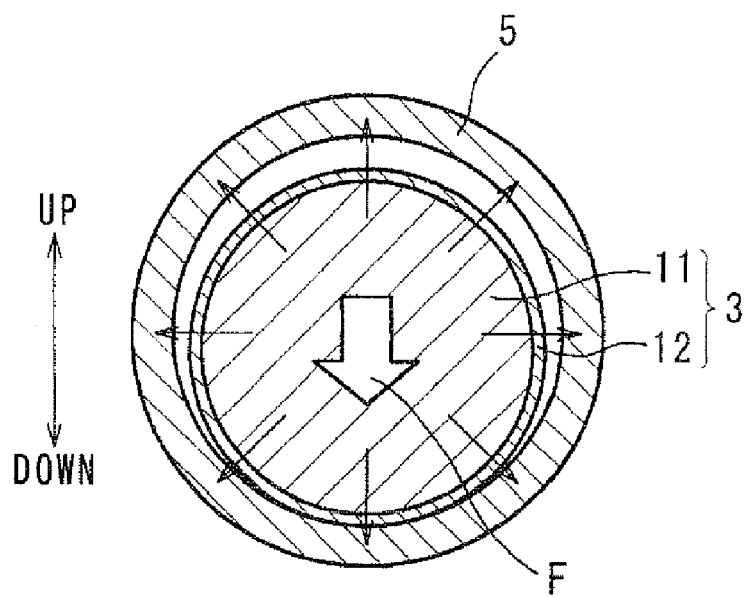
FIG. 7B is a schematic cross-sectional view illustrating a stator core and a plunger of a comparison example.
Figure 8:
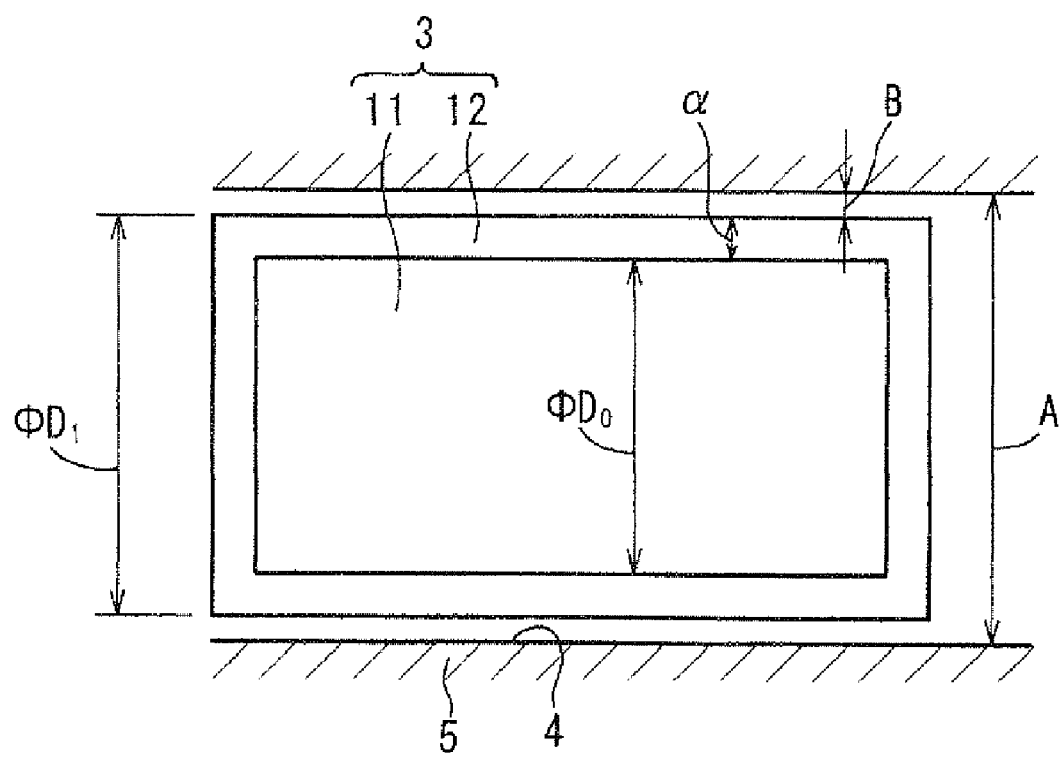
FIG. 8 is a schematic view illustrating a plunger of a linear solenoid of a comparison example.

In the comparison example, as shown in FIG. 7B, the nonmagnetic plating layer 12 having a large thickness is layered to an outer circumference face of the base 11 so as to prevent the bias of magnetic flux. However, as shown in FIG. 8, the outer side of the plunger 3 is required to be cut or shaved after the plating process so as to enhance outer diameter accuracy of the plunger 3. In this case, manufacturing cost is increased by the cutting process, and productivity is decreased by the long plating time.

According to the first embodiment in contrast to the comparison example, the second core 7 has the second blocker 9 at the position separated from the first blocker 8 in the axis direction. The second blocker 9 prevents a formation of magnetic path in the second core 7. Specifically, the second blocker 9 is located at the right-side end portion of the second core 7 in the first embodiment.

As similar to the first blocker 8, the second blocker 9 is the thin-wall part defined by forming an annular slot on the outer circumference face of the stator core 5. An outer circumference face of the thin-wall part corresponding to a bottom face of the slot is sufficiently distanced from the yoke 35 and the ring core 38 in the radial direction. Therefore, the second blocker 9 can be prevented from having a magnetic path.

The plunger 3 is made of the magnetic base 11 and the nonmagnetic plating layer 12 formed on the surface of the magnetic base 11. The plating layer 12 directly slides on the inner circumference face of the stator core 5. The magnetic base 11 has the first projection 13, the second projection 14 and the plunger main tube 15. The first projection 13 is located in the range of the first blacker 8 in the axis direction, when the plunger 3 slides over the stroke range in the axis direction by supplying electricity to the coil 2. The second projection 14 is located in the range of the second blocker 9 in the axis direction, when the plunger 3 slides over the stroke range in the axis direction by supplying electricity to the coil 2. The plunger main tube 15 is arranged at least between the first projection 13 and the second projection 14 in the axis direction, and transmits magnetism with the second core 7 in the radial direction.

Specifically, each outer circumference face of the first projection 13 and the second projection 14 has a cylindrical annular shape. The base material 11 other than the first and second projections 13, 14 corresponds to the plunger main tube 15. Axial centers of the first projection 13, the second projection 14, and the plunger main tube 15 are located on approximately the same line. That is, when seen in the axis direction, level difference between the plunger main tube 15 and the first projection 13, and level difference between the plunger main tube 15 and the second projection 14 have a constant dimension all the circumferences in the radial direction. The projections 13, 14 and the plunger main tube 15 are produced by cutting or shaving the outer circumference face of the magnetic base 11.

An example of the plunger main tube 15 will be described as the entire magnetic base 11 other than the first and second projections 13, 14.

As shown in FIG. 1A, in the linear solenoid 1 of the first embodiment, a left side part of the plunger 3 is arranged inside of the concave 36 of the first core 6. The concave 36 and the left side part of the plunger 3 overlap with each other in the axis direction. For this reason, the magnetic base 11 located inside of the concave 36 is located on left side of the first projection 13, and is located adjacent to the first core 6. The magnetic base 11 located inside of the concave 36 has the same diameter as the plunger main tube 15 located between the projections 13, 14 in the axis direction.

The plating layer 12 is formed on the outer surface of the first and second projections 13, 14 at least. Specifically, the plating layer 12 is uniformly thin-plated on the surface of all the magnetic base 11 including the first and second projections 13 and 14 with a thickness of about 10 μm, for example. Because the outer circumference face of the projection 13, 14 has the cylindrical annular shape, the plating layer 12 formed on the outer circumference face of the projection 13, 14 also has a cylindrical shape.

The plunger 3 directly slides on the stator core 5 at only two positions, that are a first sliding section and a second sliding section. The plating layer 12 of the first projection 13 slides and contacts an inner circumference face of the first blocker 8 at the first sliding section. The plating layer 12 of the second projection 14 slides and contacts an inner circumference face of the second blocker 9 at the second sliding section. The plunger 3 does not directly slides the stator core 5 at a position different from the first and second projections 13, 14.

A manufacturing process of the plunger 3 of the first embodiment is explained with reference to FIG. 2 based on the following definitions.

The plunger main tube 15 has an outer diameter dimension of $\Phi D_0$ as a plunger main diameter.

Each of the first projection 13 and the second projection 14 has an outer diameter dimension of $\Phi Dx$ and a projecting amount of $\gamma$.

The plating layer 12 has a thickness of $\beta$.

The plunger 3 has a maximum outer diameter dimension of $\Phi D_1 (=\Phi Dx+2\beta)$.

A nonmagnetic distance in the radial direction required for preventing the bias of magnetic flux is defined as $\alpha (=\beta+\gamma)$. (In contrast, a nonmagnetic distance in the comparison example corresponds to only the thickness of the plating layer 12.)

The sliding hole 4 of the stator core 5 has an inner diameter dimension of A.

The stator core 5 and the plunger 3 have a sliding clearance of B.

Explanation will be performed using concrete numerical values as an example for understanding assistance.

The stator core 5 and the plunger 3 have the sliding clearance of 20 μm(=B).

The nonmagnetic distance in the radial direction is 80 μm(=$\alpha$), which is in a range of 40 μm-80 μm so as to prevent the bias of magnetic flux.

The plating layer 12 has the thickness of 10 μm(=$\beta$).

Calculation ($\gamma=\alpha-\beta$) is performed so that the projection 13, 14 has the projecting amount of 70 μm (=80 μm−10 μm).

In this example, the plunger 3 will be produced in the following processes.

(1) The outer circumference side of the magnetic base 11 is cut or shaved, such that the magnetic base 11 of FIG. 2 is produced. At this time, the plunger main tube 15 is produced to have the outer diameter dimension $\Phi D_0$.

$$\Phi D_0 = A - B \times 2 - \alpha \times 2 = A - 20 \text{ μm} \times 2 - 80 \text{ μm} \times 2$$

The projection 13, 14 is produced to have the outer diameter dimension $\Phi Dx$.

$$\Phi Dx = A - B \times 2 - \beta \times 2 = A - 20 \text{ μm} \times 2 - 10 \text{ μm} \times 2$$

(2) The nonmagnetic plating layer 12 is layered to the surface of the magnetic base 11 with a thin thickness of 10 μm. In this plating process, the plating has a thickness error of 20% at the maximum, such that the thickness error becomes equal to or less than ±2 μm, because the plating layer 12 has only 10 μm-thickness.

Therefore, surface accuracy of the plunger 3 constructed by the magnetic base 11 and the plating layer 12 can be maintained to be high after the plating process is performed. Thus, a cutting/shaving process after the plating process can be eliminated.

Advantages of the first embodiment will be described. As mentioned above, magnetism transmittance between the stator core 5 and the plunger 3 in the radial direction is performed by the plunger main tube 15. The projection 13, 14 hardly performs the magnetism transmittance. Sliding movement between the stator core 5 and the plunger 3 is performed by the plating layers 12 of the projections 13, 14.

The nonmagnetic distance $\alpha$ defined between the stator core 5 and the magnetic base 11 in the radial direction can be flexibly set by changing the projection amount $\gamma$ of the projection 13, 14, so as to ease the bias of magnetic flux. Therefore, the thickness $\beta$ of the plating layer 12 can be made thinner. That is, a predetermined nonmagnetic distance $\alpha$ is secured by the thickness $\beta$ of the plating layer 12 and the projection amount $\gamma$ of the projection 13, 14. Therefore, attraction force of the plunger 3 in the radial direction can be made smaller. Thus, the lateral force F applied to the plunger 3 can be reduced, and the plunger 3 can achieve smooth sliding movement.

Because the thickness $\beta$ of the plating layer 12 can be made smaller, the outer diameter dimension of the plunger 3 has less variation after the plating process. Therefore, a cutting/shaving process can be eliminated after the plating process. Thus, manufacturing cost of the plunger 3 can be reduced, and manufacturing cost of the electromagnetic hydraulic control valve including the linear solenoid 1 can be reduced. Further, time necessary for the plating process can be made short, and productivity of the plunger 3 can be raised.

The outer circumference face of the projection 13, 14 has the cylindrical annular shape, and the plating layer 12 formed on the surface of the projection 13, 14 is also formed into the cylindrical shape. Therefore, contact area between the plating layer 12 of the projection 13, 14 and the inner circumference face of the stator core 5 can be made large. Thus, wear of the plating layer 12 can be reduced for a long time. As a result, reliability of the linear solenoid 1 can be improved, and reliability of the electromagnetic hydraulic control valve can be improved.

Second Embodiment

Figure 3:
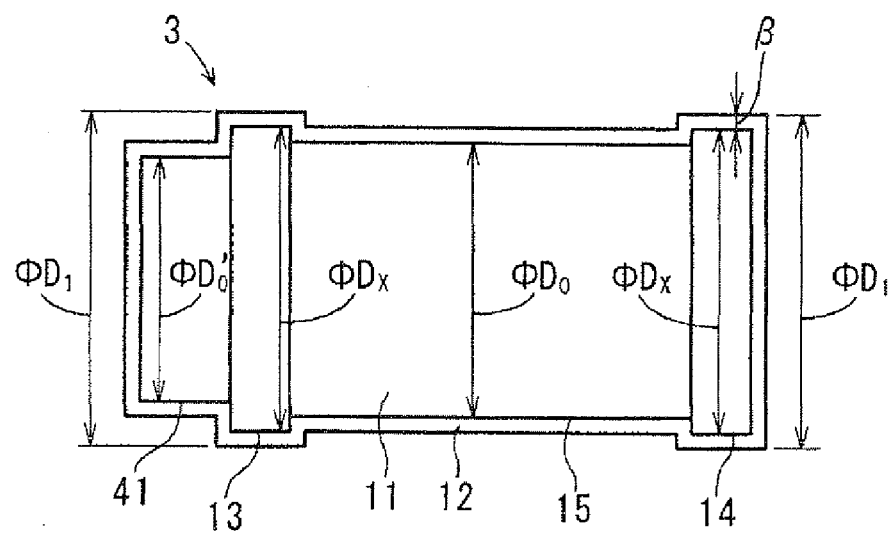
FIG. 3 is a schematic view illustrating a plunger of a linear solenoid according to a second embodiment.

A second embodiment will be described with reference to FIG. 3.

The plunger 3 has a small diameter part 41 to be arranged inside of the concave 36 of the first core 6. The small diameter part 41 is located on a front (left in FIG. 3) side of the first projection 13, and the concave 36 and the plunger 3 overlap with each other in the axis direction.

The small diameter part 41 is defined by a part of the plunger 3 located between the first core 6 and the first projection 13. The small diameter part 41 has an outer diameter dimension $\Phi D_0'$ smaller than the outer diameter dimension $\Phi D_0$ of the plunger main tube 15 ($\Phi D_0' < \Phi D_0$).

The small diameter part 41 is formed by cutting or shaving, together with the projections 13, 14 and the plunger main tube 15, in the cutting process of the magnetic base 11 before the plating process. A dimension of the small diameter part 41 in the axis direction is set larger than the maximum overlap dimension between the plunger 3 and the concave 36. That is, the small diameter part 41 extends from a front end of the plunger 3 with a length longer than the maximum overlap dimension.

The center axis of the small diameter part 41 corresponds to those of the projections 13, 14 and the plunger main tube 15. When seen from the axis direction, level difference between the small diameter part 41 and the first projection 13 in the radial direction is made constant all the circumferences.

A diameter difference ($\Phi D_0 - \Phi D_0'$) between the small diameter part 41 and the plunger main tube 15 is larger than 0. As the diameter difference becomes larger, the lateral force F applied to the first core 6 in the radial direction can be made smaller. However, if the diameter difference becomes too larger, a magnetism gap from the first core 6 becomes large while electricity is not supplied to the coil 2. In this case, initial response property may be deteriorated. Therefore, for example, the diameter difference ($\Phi D_0 - \Phi D_0'$) is set in a range of 50 μm-0.5 mm with considering a relationship between the lateral force F and the initial response property.

According to the second embodiment, the plunger 3 has the small diameter part 41, and the outer diameter dimension $\Phi D_0'$ of the small diameter part 41 is set smaller than the outer diameter dimension $\Phi D_0$ of the plunger main tube 15 ($\Phi D_0' < \Phi D_0$).

Therefore, even if the center axis of the plunger 3 becomes eccentric to the center axis of the stator core 5 by gravity, for example, nonmagnetic clearance distance between the plunger 3 and the concave 36 can be made larger in the radial direction. Thus, the lateral force F applied to the plunger 3 toward the first core 6 can be reduced.

Because the lateral force F applied to the plunger 3 toward the first core 6 can be reduced, the lateral force F can be made smaller as a whole. Thus, the plunger 3 can have smooth sliding movement. Accordingly, the plunger 3 can slide more smoothly in the second embodiment, compared with the first embodiment.

Third Embodiment

A third embodiment will be described with reference to FIGS. 4A and 4B. The ring core 38 used in the first embodiment is eliminated in the third embodiment.

Specifically, a length of a concave 37 defined in the bottom of the yoke 35 is made longer in the axis direction. Further, a length of the second core 7 arranged in the concave 37 is made longer in the axis direction. Therefore, a distance between the concave 37 and the second core 7 opposing to each other in the radial direction is made larger, while magnetism (magnetic flux MF) is transmitted from the yoke 35 to the second core 7.

Figure 4A:
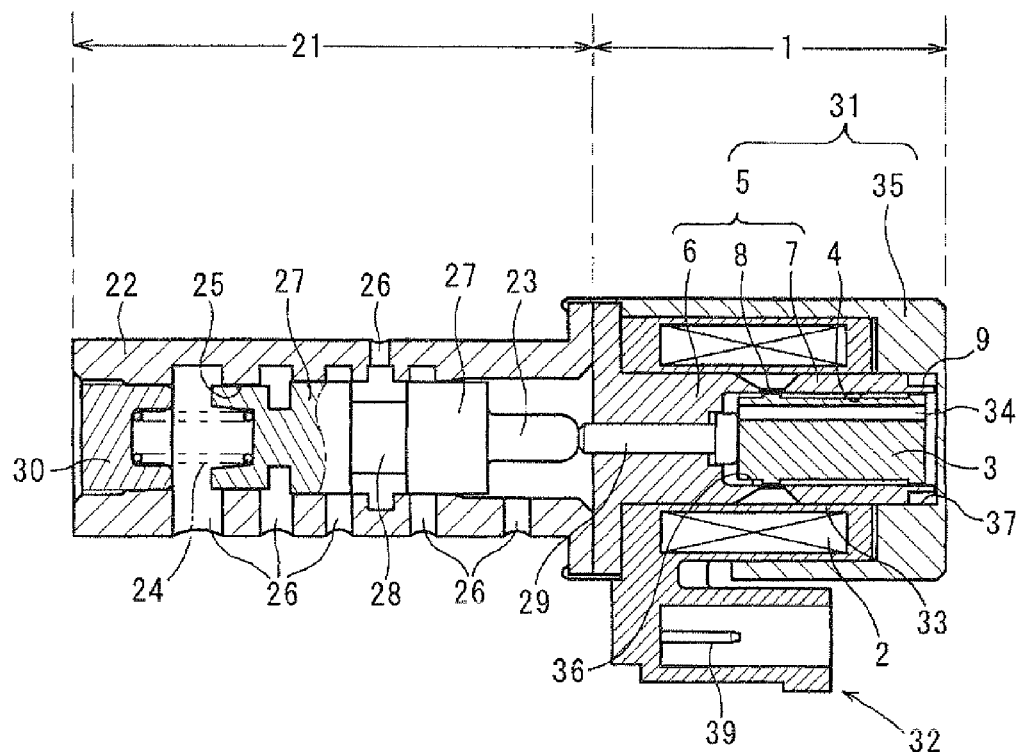
FIG. 4A is a schematic cross-sectional view illustrating an electromagnetic spool valve including a linear solenoid according to a third embodiment.
Figure 4B:
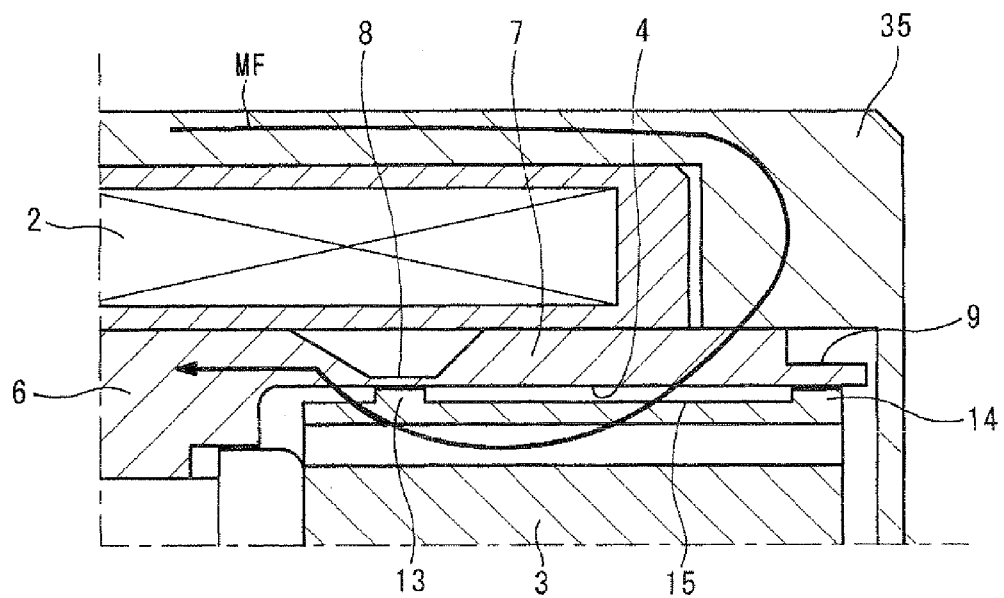
FIG. 4B is an enlarged cross-sectional view illustrating the linear solenoid.

At this time, as shown in FIGS. 4A and 4B, the second blocker 9 is arranged at a rear part of the second core 7. The plating layer 12 of the second projection 14 of the plunger 3 slides in a range of the second blocker 9 in the axis direction. In the third embodiment, the same advantages can be obtained as the first embodiment.

Fourth Embodiment

Figure 5A:
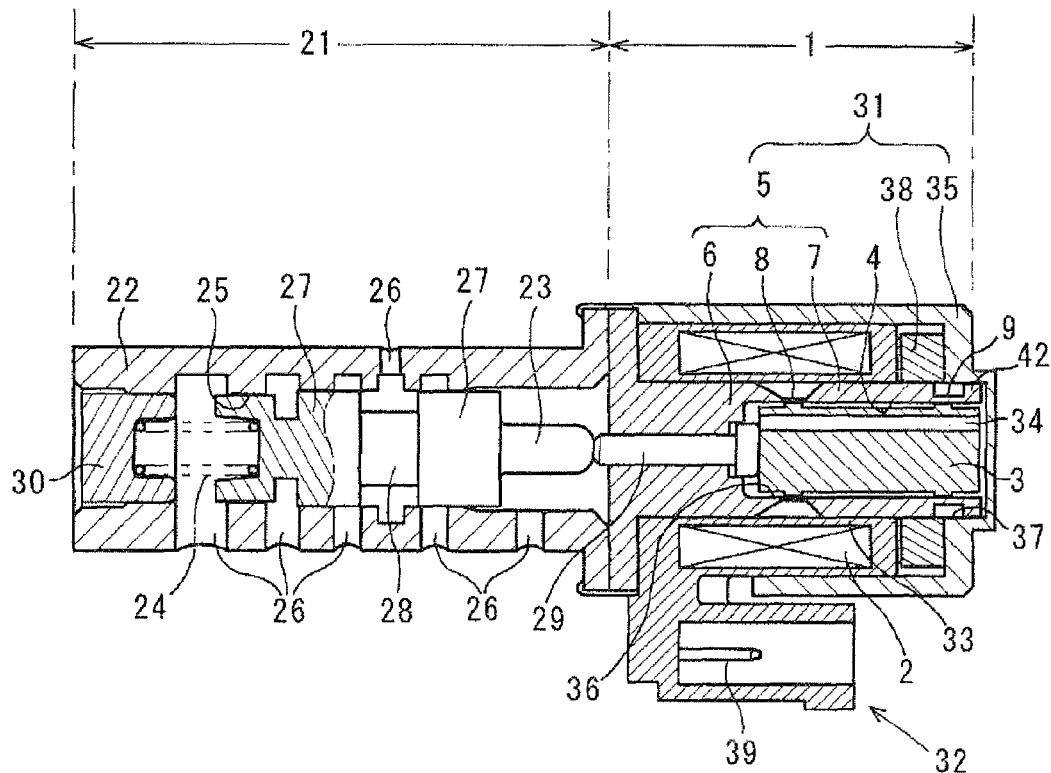
FIG. 5A is a schematic cross-sectional view illustrating an electromagnetic spool valve including a linear solenoid according to a fourth embodiment.

A fourth embodiment will be described with reference to FIGS. 5A, 5B and 6. A part of the second core 7 located rear side of the second blocker 9 has a large diameter part 42. The large diameter part 42 has a thickness larger than that of the second blocker 9 in the radial direction.

Figure 5B:
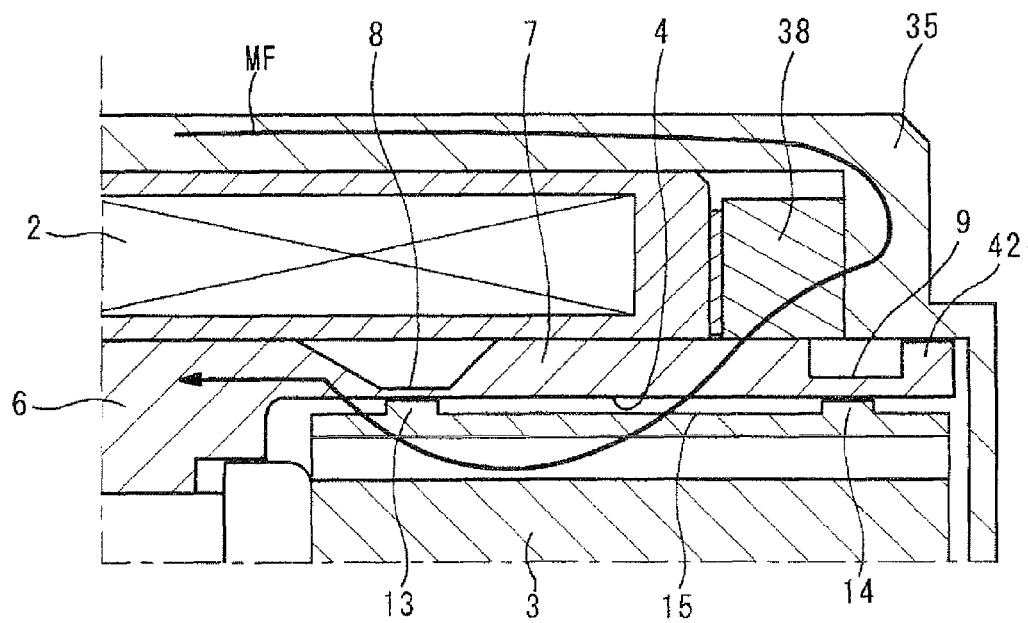
FIG. 5B is an enlarged cross-sectional view illustrating the linear solenoid.

As shown in FIG. 5B, a position of the second blocker 9 is made frontward by a predetermined dimension from a rear end of the second core 7. An outer diameter dimension of the large diameter part 42 is larger than that of the second blocker 9, and is equal to or smaller than that of the second core 7 located between the blockers 8, 9 in the axis direction so as to transmit magnetism on periphery side.

Due to the large diameter part 42 located outer side than the second blocker 9 in the axis direction, distortion can be prevented from arising in rear side of the second core 7 having the second blocker 9.

Therefore, even if heat treatment is performed to the stator core 5, distortion can be prevented from being generated, due to the large diameter part 42. Thus, the sliding performance of the plunger 3 can be secured, and reliability of the linear solenoid 1 can be increased.

Figure 6:
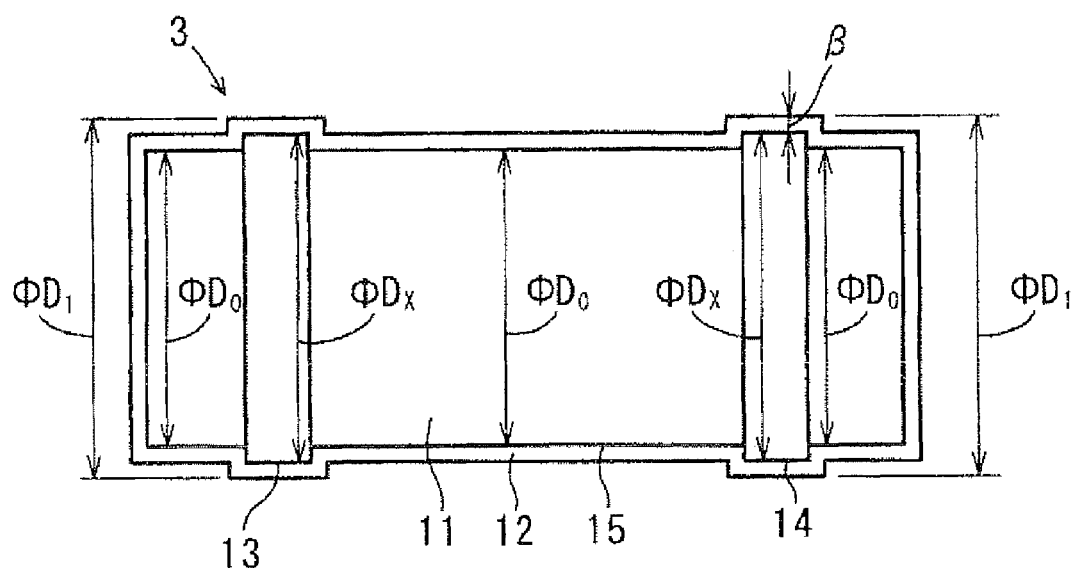
FIG. 6 is a schematic view illustrating a plunger of the linear solenoid of the fourth embodiment.

As shown in FIG. 6, a position of the second projection 14 is located frontward by a predetermined amount from the rear end of the plunger 3, because the second blocker 9 is located frontward than the rear end of the second core 7. In this case, the plunger 3 can be made symmetrical relative to a center line of the plunger 3 extending perpendicular to the axis direction.

Specifically, an axis length between the front end of the plunger 3 and the first projection 13 is made equal to an axis length between the rear end of the plunger 3 and the second projection 14. Substantially, there is no distinction between the first projection 13 and the second projection 14.

Therefore, the plunger 3 has no directivity when the plunger 3 is assembled. For this reason, incorrect attachment of the plunger 3 can be prevented, and the plunger 3 becomes easy to be assembled. Thus, productivity of the electromagnetic hydraulic control valve including the linear solenoid 1 can be improved.

As shown in FIG. 6, a plunger diameter between the front end of the plunger 3 and the first projection 13, and a plunger diameter between the rear end of the plunger 3 and the second projection 14 are made equal to the outer diameter dimension $\Phi D_0$ of the plunger main tube 15.

Alternatively, a small diameter part 41 may be defined between the front end of the plunger 3 and the first projection 13, and a small diameter part 41 may be defined between the rear end of the plunger 3 and the second projection 14. That is, the fourth embodiment may be combined with the second embodiment.

A ventilation slot extending in the axis direction may be formed in a part of the projection 13, 14. In this case, the ventilation pore 34 extending inside of the plunger 3 may be eliminated. If plural ventilation slots are defined, the slots may be arranged at equal intervals in a circumference direction.

Alternatively, the projection 13, 14 may be defined by plural protrusions projected in the radial direction. The protrusions may have curved outer faces approximately parallel to the inner circumference face of the sliding hole 4. Further, in this case, because a clearance between the protrusions in the circumference direction is operated as a ventilation slot, the ventilation pore 34 of the plunger 3 may be eliminated.

The linear solenoid 1 is used for the electromagnetic hydraulic control valve of the automatic shift in the above embodiments. Alternatively, the present invention may be applied to other control valve to control other than the automatic shift. Moreover, the present invention may be applied to a solenoid valve other than the electromagnetic hydraulic control valve.

The linear solenoid 1 is used for driving the spool valve 21 in the above embodiment. Alternatively, the linear solenoid 1 may be used for directly or indirectly driving an object other than the valve.

Such changes and modifications are to be understood as being within the scope of the present invention as defined by the appended claims.

What is claimed is:
1. A linear solenoid comprising:
a coil to generate a magnetic force by being supplied with electricity;
a plunger supported to slide in an axis direction; and
a stator core integrally having
   a first magnetic core to attract the plunger using the magnetic force generated by the coil,
   a second magnetic core to transmit magnetism with the plunger in a radial direction, and
   a first blocker arranged between the first magnetic core and the second magnetic core, the first blocker restricting the first magnetic core and the second magnetic core from directly having magnetic combining with each other, wherein
the plunger directly slides on an inner circumference face of the stator core,
the second magnetic core has a second blocker distanced from the first blocker in the axis direction,
the second blocker restricts the second magnetic core from forming a magnetic path,
each of the first blocker and the second blocker is defined by forming an annular slot on an outer circumference face of the stator core,
the plunger has a magnetic base and a nonmagnetic plating layer defined on a surface of the magnetic base,
the nonmagnetic plating layer directly slides on the inner circumference face of the stator core,
the magnetic base has
   a first projection projected in the radial direction and located in a range of the first blocker relative to entire stroke range of the plunger in the axis direction,
   a second projection projected in the radial direction and located in a range of the second blocker relative to entire stroke range of the plunger in the axis direction, and
   a plunger main tube located between the first projection and the second projection in the axis direction, the plunger main tube transmitting magnetism with the second magnetic core in the radial direction,
the plating layer is arranged on at least outer faces of the first and second projections,
the plating layer of the first projection slides on an inner circumference face of the first blocker at a first sliding section, the plating layer of the second projection slides on an inner circumference face of the second blocker at a second sliding section, and the plunger directly slides on the inner circumference face of the stator core only at the first sliding section and the second sliding section.

2. The linear solenoid according to claim 1, wherein each outer circumference face of the first projection and the second projection has a cylindrical annular shape.

3. The linear solenoid according to claim 1, wherein the first magnetic core has a tube-shape concave, the plunger is arranged inside of the concave, the concave and the plunger overlap with each other in the axis direction, and a part of the plunger located between the first magnetic core and the first projection has an outer diameter dimension smaller than that of the other part of the plunger located between the first projection and the second projection.

4. The linear solenoid according to claim 1, wherein the second magnetic core has a large diameter part having a thickness larger than that of the second blocker in the radial direction, and the large diameter part is located periphery side of the second blocker opposite from the first blocker in the axis direction.

5. The linear solenoid according to claim 1, wherein the plunger has a symmetrical shape relative to a center line of the plunger extending approximately perpendicular to the axis direction.

* * * * *